US012739921B2

(12) United States Patent
Li

(10) Patent No.: US 12,739,921 B2
(45) Date of Patent: Sep. 15, 2026

(54) BEAM FAILURE RECOVERY METHOD AND APPARATUS AND STORAGE MEDIUM

(71) Applicant: Beijing Xiaomi Mobile Software Co., Ltd., Beijing (CN)

(72) Inventor: Mingju Li, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 293 days.

(21) Appl. No.: 18/566,794

(22) PCT Filed: Jun. 11, 2021

(86) PCT No.: PCT/CN2021/099835
§ 371 (c)(1), (2) Date: Dec. 4, 2023

(87) PCT Pub. No.: WO2022/257136
PCT Pub. Date: Dec. 15, 2022

(65) Prior Publication Data

US 2024/0276578 A1 Aug. 15, 2024

(51) Int. Cl.

| | |
|---|---|
| ***H04W 76/19*** | (2018.01) |
| ***H04W 72/1268*** | (2023.01) |
| ***H04W 72/21*** | (2023.01) |
| ***H04W 74/0833*** | (2024.01) |
| *H04W 80/02* | (2009.01) |

(52) U.S. Cl.
CPC ....... *H04W 76/19* (2018.02); *H04W 72/1268* (2013.01); *H04W 72/21* (2023.01); *H04W 74/0833* (2013.01); *H04W 80/02* (2013.01)

(58) Field of Classification Search
None
See application file for complete search history.

(56) References Cited

U.S. PATENT DOCUMENTS

| | | | | |
|---|---|---|---|---|
| 2020/0350972 | A1 | 11/2020 | Yi et al. | |
| 2021/0028848 | A1 | 1/2021 | Tsai et al. | |
| 2022/0104038 | A1* | 3/2022 | Zhou | H04W 24/04 |
| 2023/0353223 | A1* | 11/2023 | Jia | H04B 7/06964 |
| 2023/0388820 | A1* | 11/2023 | Matsumura | H04L 5/0051 |

FOREIGN PATENT DOCUMENTS

| | | |
|---|---|---|
| CN | 112119597 A | 12/2020 |

OTHER PUBLICATIONS

Office Action issued by the Russian Federation Federal Institute of Industrial Property on May 21, 2024, in corresponding Application No. RU 2024100245, 5 pages.

(Continued)

*Primary Examiner* — Jenkey Van
(74) *Attorney, Agent, or Firm* — Finnegan, Henderson, Farabow, Garrett & Dunner, L.L.P.

(57) ABSTRACT

A beam failure recovery method is performed by a terminal, and includes: performing a beam failure detection on a plurality of Transmit/Receive Points (TRPs) of the terminal, in response to the terminal being configured with the plurality of TRPs; and triggering a random access-based beam failure recovery in response to detecting that there is a first TRP on which a beam failure occurs among the plurality of TRPs.

16 Claims, 6 Drawing Sheets

(56) References Cited

OTHER PUBLICATIONS

"Discussion on beam management for MTRP", NTT Docomo, Inc., 3GPP TSG RAN WG1 #103-e, R1-2009177, e-Meeting, Oct. 26-Nov. 13, 2020, 8 pages.
Extended European Search Report Issued in Application No. 21944643.2 dated Jun. 26, 2024, 8 pages.
International Search Report and Written Opinion of International Application No. PCT/CN2021/099835, dated Dec. 24, 2021, 13 pages.
ZTE, "Enhancements on beam management for multi-TRP", 3GPP TSG RAN WG1 Meeting #105-e, R1-2104587, e-Meeting, May 10-27, 2021, 17 pages.
Samsung, "Enhancements on beam management for multi-TRP", 3GPP TSG RAN WG1 Meeting #105-e, R1-2105293, e-Meeting, May 10-27, 2021, 5 pages.
"Enhancements on beam management for multi-TRP", LG Electronics, 3GPP TSG-RAN WG1 #105-e, R2-2105781, e-Meeting, May 10-27, 2021, 13 pages.
"Enhancements on beam management for multi-TRP", ETRI, 3GPP TSG-RAN WG1 #104b-e, R1-2103324, e-Meeting, Apr. 12-20, 2021, 7 pages.
Notice of the first review opinion issued by the Japanese Patent Office on Oct. 23, 2024, in corresponding Application No. JP 2023-576031, 8 pages.

* cited by examiner

BEAM FAILURE RECOVERY METHOD AND APPARATUS AND STORAGE MEDIUM

CROSS-REFERENCE TO RELATED APPLICATION

This application is the US national phase of International Application No. PCT/CN2021/099835, filed on Jun. 11, 2021, the content of which is hereby incorporated by reference in its entirety.

TECHNICAL FIELD

The disclosure relates to a field of communication technologies, in particular to a beam failure recovery method, a beam failure recovery apparatus and a storage medium.

BACKGROUND

In a New Radio (NR) technology, for example, when a communication frequency band is a frequency range 2, beam-based transmission and reception is required to ensure coverage due to fast attenuation of high-frequency channels.

In the related art, a network device is configured with a plurality of Transmit/Receive Points (transmission and reception points, TRPs). When the network device has a plurality of TRPs, the network device can provide a service to a terminal using these TRPs. For example, the TRPs can be used to send a physical downlink control channel (PDCCH) to the terminal. The network device uses the TRPs to send the PDCCH to the terminal, and the terminal detects reference signal resources used for failure detection. When the terminal detects that a radio link value of a reference signal used for failure detection is less than a threshold, the terminal needs to initiate a beam failure recovery (BFR) request to the network device for BFR.

SUMMARY

According to a first aspect of embodiments of the disclosure, a beam failure recovery (BFR) method, performed by a terminal, is provided. The method includes:

performing a beam failure detection on a plurality of Transmit/Receive Points (TRPs) of the terminal, in response to the terminal being configured with the plurality of TRPs; and triggering a random access-based BFR, in response to detecting that there is a first TRP on which a beam failure occurs among the plurality of TRPs.

According to a second aspect of embodiments of the disclosure, a beam failure recovery (BFR) device is provided. The device includes:

a processor; and a memory storing instructions executable by the processor;

in which the processor is configured to perform a beam failure detection on a plurality of Transmit/Receive Points (TRPs) of the terminal, in response to the terminal being configured with the plurality of TRPs; and trigger a random access-based beam failure recovery in response to detecting that there is a first TRP on which a beam failure occurs among the plurality of TRPs.

According to a third aspect of embodiments of the disclosure, a non-transitory computer-readable storage medium is provided. The storage medium has instructions stored thereon. When the instructions are executed by a processor of a terminal, the terminal is caused to: perform a beam failure detection on a plurality of Transmit/Receive Points (TRPs) of the terminal, in response to the terminal being configured with the plurality of TRPs; and trigger a random access-based beam failure recovery in response to detecting that there is a first TRP on which a beam failure occurs among the plurality of TRPs.

It is understandable that the above general description and the following detailed descriptions are illustrative and explanatory only and do not limit the disclosure.

BRIEF DESCRIPTION OF THE DRAWINGS

The accompanying drawings, which are incorporated in and constitute a part of this specification, illustrate embodiments consistent with the disclosure and together with the description serve to explain the principles of the disclosure.

DETAILED DESCRIPTION

Reference will now be made in detail to embodiments, examples of which are illustrated in the accompanying drawings. The following description refers to the accompanying drawings in which the same numbers in different drawings represent the same or similar elements unless otherwise represented. The implementations set forth in the following description of embodiments do not represent all implementations consistent with the disclosure. Instead, they are merely examples of apparatuses and methods consistent with aspects related to the disclosure as recited in the appended claims.

Figure 1:
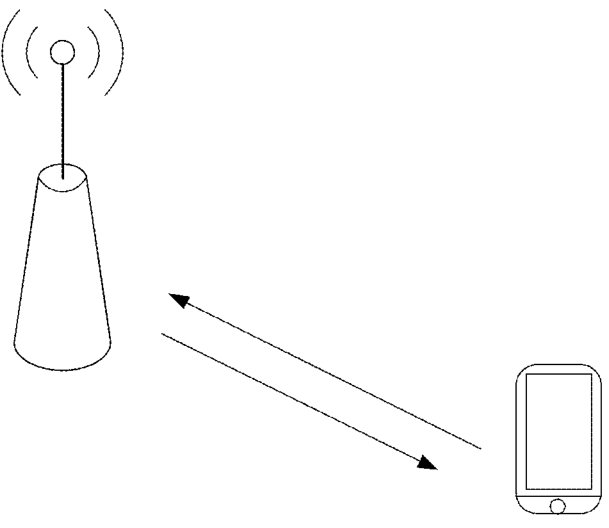
FIG. 1 is a schematic diagram illustrating a wireless communication system according to an embodiment.

A beam failure recovery (BFR) method according to embodiments of the disclosure may be applied in a wireless communication system illustrated in FIG. 1. As illustrated in FIG. 1, the wireless communication system includes a terminal and a network device. The terminal is connected to the network device via radio resources for transmitting and receiving data.

It is understandable that the wireless communication system illustrated in FIG. 1 is only for schematic illustration, and other network devices may be included in the wireless communication system, such as the core network device, the wireless relay device or the wireless backhaul device, which are not drawn in FIG. 1. The number of the network devices and the number of the terminals included in the wireless communication system are not limited in embodiments of the disclosure.

It is further understandable that the wireless communication system of embodiments of the disclosure is a network that provides a wireless communication function. The wireless communication system may employ different communication technologies, such as code division multiple access (CDMA), wideband code division multiple access (WCDMA), time division multiple access (TDMA), frequency division multiple access (FDMA), orthogonal frequency-division multiple access (OFDMA), single carrier FDMA (SC-FDMA), and carrier sense multiple access/collision avoidance. Depending on factors such as capacity, rate, and delay of different networks, the network can be classified as a second Generation (2G) network, a 3G network, a 4G network, or a future evolved network, such as a 5G network, which can also be called "NR network". For easy of description, in this disclosure, the wireless communication network is sometimes simply referred to as network.

The network device involved in the disclosure may also be referred to as radio access network device. The radio access network device may be: a base station, an evolved base station (evolved node B, i.e., eNB), a home base station, an access point (AP) in a wireless fidelity (WIFI) system, a wireless relay node, a wireless backhaul node, a transmission point (TP) or a TRP, a gNB in a NR system, or components or a part of the devices that constitute the base station. The network device may also be a vehicle-mounted device in a vehicle to everything (V2X) communication system. It is understandable that the specific technology and the specific device form used by the network device are not limited in embodiments of the disclosure.

The terminal involved in the disclosure may also be referred to as terminal device, user equipment (UE), mobile station (MS), or mobile terminal (MT), which is a device that provides voice and/or data connectivity to a user. For example, the terminal can be a handheld device or a vehicle-mounted device with a wireless connectivity function. Currently, the terminals include, for example, a mobile phone, a pocket personal computer (PPC), a handheld computer, a personal digital assistant (PDA), a laptop, a tablet computer, a wearable device, or a vehicle-mounted device, etc. In addition, the terminal device may also be a vehicle-mounted device in the V2X communication system. It is understandable that the specific technology and the specific device form adopted by the terminal are not limited in embodiments of the disclosure.

In this disclosure, data transmission between the network device and the terminal is performed based on beams. When transmitting data between the network device and the terminal based on beams, the network device can use one or more Transmit/Receive Points (TRPs) to provide services to the terminal. For example, the network device can use the one or more TRPs to send a physical downlink control channel (PDCCH) to the terminal. When the terminal detects that radio link quality of a reference signal resource used for failure detection is lower than a threshold, the terminal will perform the beam failure recovery (BFR). The reference signal resource used for the failure detection can be explicitly configured by the base station. When the base station does not explicitly configure the reference signal resource, the reference signal resource for quasi co-location (QCL) type D in a transmission state indication (TCI) state corresponding to the Control Resource set (CORESET) used for sending the PDCCH is used. Performing the BFR by the terminal is also understood as performing the Link recovery by the terminal.

In the related art, the cell specific BFR has been defined. As an example, a Special cell (SpCell) specific BFR is defined. The SpCell includes a Primary cell (Pcell) and a Primary secondary cell (PScell). A mechanism of the SpCell specific BFR is a random access-based BFR mechanism, in which when the terminal detects that a beam failure has occurred in the SpCell, the terminal initiates a random access process to request a beam recovery. In addition, a secondary cell (SCell) specific BFR is defined, which is a physical uplink control channel (PUCCH)-scheduling request (SR) mechanism and/or a physical uplink shared channel (PUSCH)-medium access control control element (MAC CE) mechanism. That is, when the terminal detects that a beam failure has occurred in the Scell, the terminal sends MAC CE information on the PUSCH resource to indicate BFR related information. However, the PUSCH resource can be PUSCHs dedicated to send the SR on the PUCCH-SR resource of the BFR or other PUSCH resources.

In the related art, the TRP specific BFR has been proposed. That is, when the terminal is configured with Multi-TRP PDCCH transmission and when a beam failure occurs on a certain TRP, the terminal may send a BFR request to inform the network device that there is a TRP on which the beam failure has occurred and to request the BFR. The TRP specific BFR has currently agreed to use the SCell-based PUCCH-SR mechanism and/or the SCell-based PUSCH MAC CE mechanism to deal with the BFR request. However, for the SpCell, if the beam failure occurs on multiple TRPs, whether and how to trigger the random access-based BFR request are issues that need to be solved.

In the related art, the mechanism of performing the BFR by the terminal includes the cell specific BFR. The cell specific BFR includes a random access-based BFR mechanism (Spcell specific BFR) and a physical uplink control channel (PUCCH)-scheduling request (SR) and/or physical uplink shared channel (PUSCH) medium access control control element (MAC CE)-based BFR mechanism (Scell specific BFR). The mechanism of performing the BFR by the terminal also includes a TRP specific BFR mechanism. The random access-based BFR mechanism includes contention based random access (CBRA) method and contention free random access (CFRA) method. With the Spcell specific BFR, i.e., random access-based BFR mechanism, the terminal initiates a random access process to request the beam recovery. With the Scell specific BFR, i.e., the PUCCH-SR and/or PUSCH MAC CE-based BFR mechanism, the terminal performs the BFR based on the PUCCH-SR and/or PUSCH MAC CE mechanism. When the terminal detects that beam failure occurs in the SCell, the terminal sends MAC CE information on a PUSCH resource to indicate BFR related information. The PUSCH resource may be obtained by sending a SR on a PUCCH-SR resource dedicated to the BFR or other PUSCH resources. Based on the TRP specific BFR mechanism, the Scell specific BFR will be reused.

In the related art, in performing the beam failure detection, the terminal usually detects a reference signal (RS) used for TRP beam failure detection. When the radio link quality of the RS is detected below a threshold for N times, the terminal determines that a failure of the RS is detected. When the failure occurs on all RSs used for the TRP failure detection, the terminal determines that the beam failure of the TRP is detected. In the related art, there is a scenario of Multi-TRP PDCCH between the terminal and the network device. In the scenario of Multi-TRP PDCCH, the terminal configures both the random access-based BFR mechanism and the TRP specific BFR mechanism in the same cell. Since multiple TRPs correspond to multiple reference signal sets for failure detection respectively, the same cell will be configured with multiple reference signal sets for the failure detection. Each of the plurality of reference signal sets for the failure detection may be explicitly configured by the base station, or the reference signal sets can be determined based on the QCL Type D reference signal in the TCI state of the CORESET when the reference signal sets are not configured explicitly by the base station. Whether to trigger a cell specific BFR or perform the random access-based BFR when the beam failure occurs on two or more TRPs of the plurality of TRPs is not solved in the related art.

Embodiments of the disclosure provide a BFR method, in which a random access-based BFR is triggers when it is detected that there is a TRP on which a beam failure occurs among the plurality of TRPs.

In embodiments of the disclosure, for convenience of description, one TRP among at least two TRPs on which the beam failure occurs among the multiple TRPs configured for the terminal is called “first TRP”, and the other is called “second TRP”.

Figure 2:
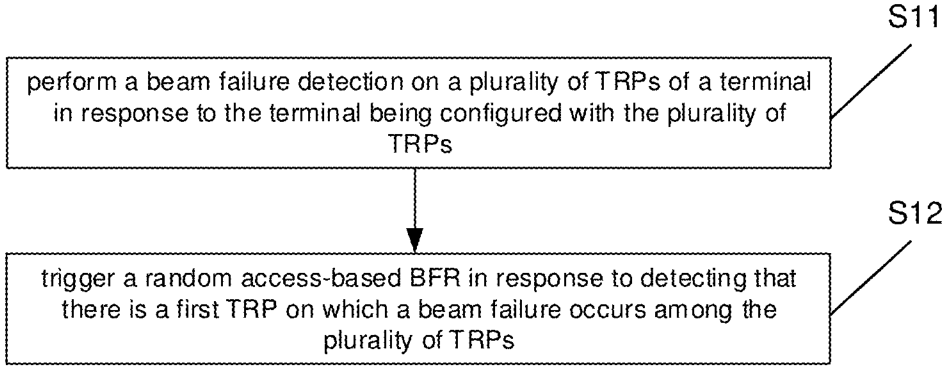
FIG. 2 is a flowchart illustrating a beam failure recovery method according to an embodiment.

FIG. 2 is a flowchart illustrating a BFR method according to an embodiment. As illustrated in FIG. 2, the BFR method is performed by a terminal. The terminal is configured with a random access-based BFR mechanism and a TRP specific BFR mechanism for the same cell. The BFR method according to embodiments of the disclosure includes the following.

At step S11, a beam failure detection is performed on a plurality of TRPs of the terminal, in response to the terminal being configured with the plurality of TRPs.

At step S12, a random access-based BFR is triggered, in response to detecting that there is a first TRP on which a beam failure occurs among the plurality of TRPs.

In embodiments of the disclosure, “the terminal being configured with the plurality of TRPs” means that the terminal is configured with multiple reference signal resource sets for the beam failure detection and/or the terminal is configured with multiple control resource pool index values (CORESETPoolIndex values). “The terminal being configured with multiple reference signal resource sets for the beam failure detection” means that the multiple reference signal resource sets for failure detection are explicitly configured for the terminal. When the reference signal resource sets for failure detection are not explicitly configured for the terminal, the terminal may determine one or more reference signal resource sets for failure detection based on CORESETPoolIndex or CORESETGroup. For example, when all CORESETs of the terminal correspond to the same CORESETPoolIndex or CORESETGroup, the terminal determines the reference signal resource used for failure detection based on a reference signal resource of the QCL Type D of the TCI state of at least one CORESET among the all CORESETs. When all CORESETs of the terminal correspond to different CORESETPoolIndex or CORESETGroup, the terminal determines a respective reference signal resource for failure detection corresponding to each CORESETPoolIndex or CORESETGroup based on the reference signal resource of the QCL Type D of the TCI state of at least one CORESET among all CORESETs of each CORESETPoolIndex or CORESETGroup. Each CORESETPoolIndex or CORESETGroup corresponds to a respective reference signal resource used for failure detection.

In all embodiments of the disclosure, “the terminal being configured with the plurality of TRPs” means that the terminal is configured to perform uplink and downlink transmission with a plurality of TRPs of the base station. In some implementations, the terminal can determine multiple TRP configurations based on the communication standard. Or, the terminal can determine multiple TRP configurations based on configuration parameters or configuration signaling sent by the base station. Or, the terminal can negotiate with the base station to determine the plurality of TRPs and the plurality of TRPs is a subset or a true subset of a plurality of TRPs of the base station (so there is a possibility that the base station can make different UEs respectively correspond to different TRP sets, or some UEs correspond to the same TRP set and other UEs corresponding to different TRP sets). The same content will not be repeated again.

In embodiments of the disclosure, “the terminal performing the beam failure detection on the plurality of TRPs” means that when performing the beam failure detection on some or all of the plurality of TRPs, the terminal may detect respective reference signal sets corresponding to these TRPs. For example, the terminal detects respective reference signal sets used for performing the beam failure detection on a first TRP and/or a second TRP.

In embodiments of the disclosure, for detecting that there is a TRP on which the beam failure occurs, a conventional method for determining that there is a TRP on which the beam failure occurs may be adopted. For example, given a certain TRP, for each reference signal (RS) in the reference signal set for the failure detection, when detecting that the radio link quality of this RS is below a threshold for N times, it is determined that the beam failure occurs on the TRP.

In embodiments of the disclosure, when detecting that there is a first TRP on which the beam failure occurs among the plurality of TRPs, the random access-based BFR may be triggered. Therefore, the random access-based BFR is performed timely in the multi-TRP scenario, thereby ensuring timeliness and effectiveness of BFR.

In the BFR method according to embodiments of this disclosure, the terminal may trigger the random access-based BFR when determining that a trigger condition for triggering the random access-based BFR is satisfied.

Figure 3:
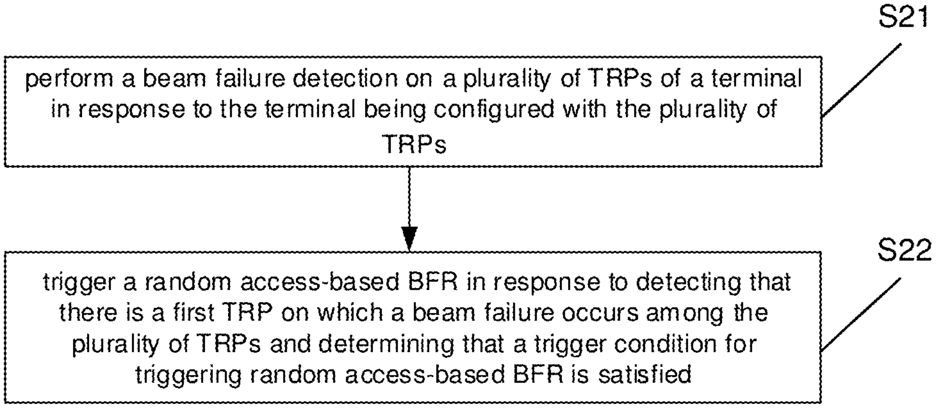
FIG. 3 is a flowchart illustrating a beam failure recovery method according to an embodiment.

FIG. 3 is a flowchart illustrating a BFR method according to an embodiment. As illustrated in FIG. 3, the BFR method is performed by a terminal. The BFR method includes the following.

At step S21, a beam failure detection is performed on a plurality of TRPs of the terminal, in response to the terminal being configured with the plurality of TRPs.

At step S22, a random access-based BFR is triggered, in response to detecting that there is a first TRP on which a beam failure occurs among the plurality of TRPs and determining that a trigger condition for triggering the random access-based BFR is satisfied.

In embodiments of the disclosure, whether the trigger condition for triggering the random access-based BFR is satisfied may be determined in the TRP specific BFR process after detecting that there is the first TRP on which the beam failure occurs among the plurality of TRPs.

In the BFR method according to embodiments of the disclosure, when the terminal detects that there is the first TRP on which the beam failure occurs among the plurality of TRPs, the terminal may wait for a PUCCH resource that exists at the nearest time compared to other PUCCHs and send a scheduling request (SR) on this PUCCH resource. In embodiments of the disclosure, for the convenience of description, the time when the terminal detects that there is the first TRP on which the beam failure occurs among the plurality of TRPs is called "first time" (denoted by "t1"), and the time when the terminal sends the SR on the PUCCH-SR resource is called "second time" (denoted by "t2"). In an example, the terminal detects respective reference signal sets used for performing the beam failure detection on the first TRP and/or second TRP. The terminal detects that the beam failure occurs on the first TRP at the first time t1, the terminal waits for the PUCCH-SR that is at the second time t2 nearest to the first time t1, and then the terminal sends the SR on the PUCCH-SR resource at the second time t2.

It is understandable that the wording "first time" and the wording "t1" involved in embodiments of the disclosure may be used interchangeably, and those skilled in the art could understand that their meanings are the same and the meaning of the wording "first time" or "t1" involved in each embodiment is the same.

It is further understandable that the wording "second time" and the wording "t2" involved in embodiments of the disclosure may be used interchangeably, and those skilled in the art could understand that their meanings are the same and the meaning of the wording "second time" or "t2" involved in each embodiment is the same.

Figures 4, 5, 6:
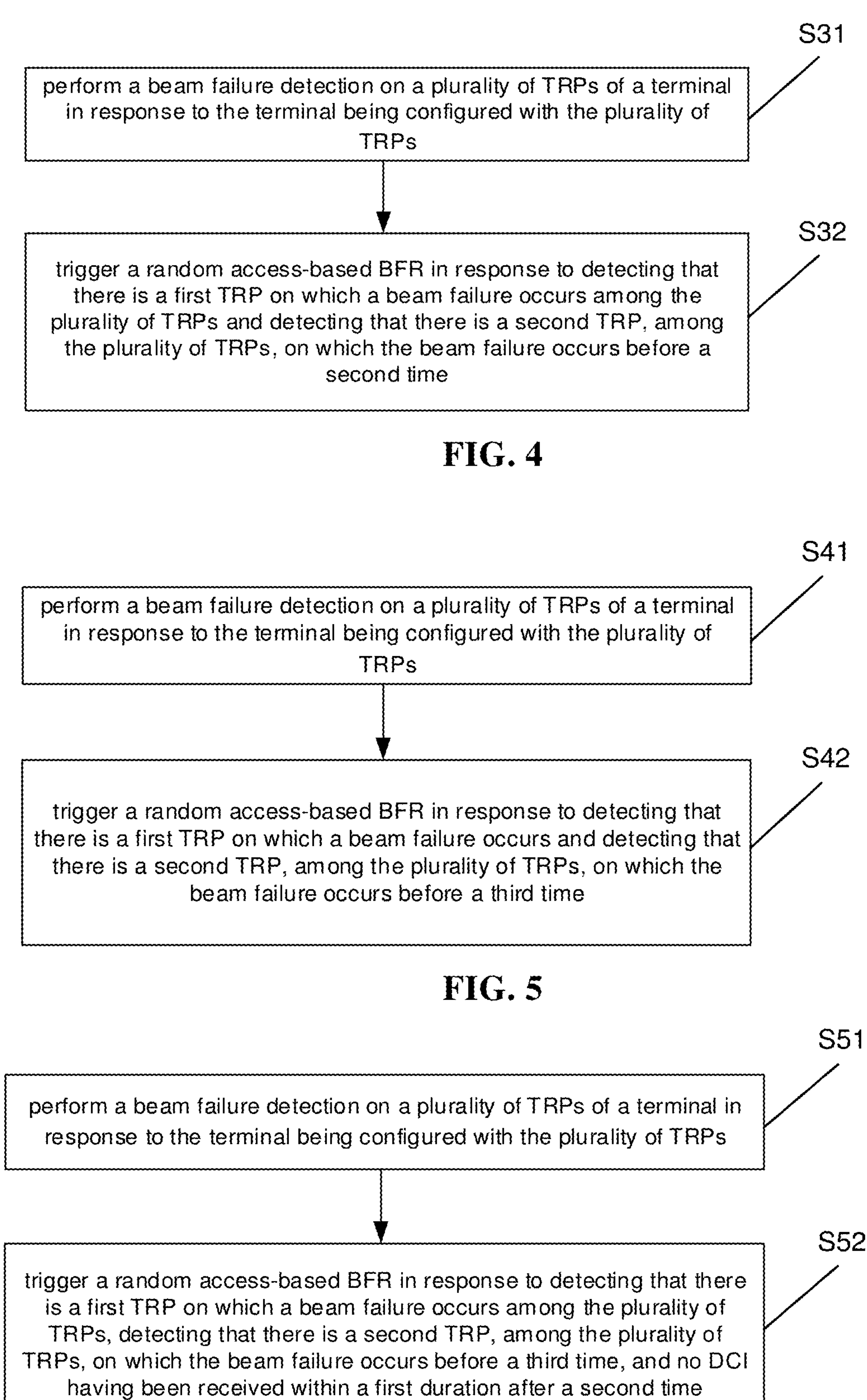
FIG. 4 is a flowchart illustrating a beam failure recovery method according to an embodiment.
FIG. 5 is a flowchart illustrating a beam failure recovery method according to an embodiment.
FIG. 6 is a flowchart illustrating a beam failure recovery method according to an embodiment.

FIG. 4 is a flowchart illustrating a BFR method according to an embodiment. As illustrated in FIG. 4, the BFR method is performed by a terminal. The BFR method includes the following.

At step S31, a beam failure detection is performed on a plurality of TRPs of a terminal in response to the terminal being configured with the plurality of TRPs.

At step S32, a random access-based BFR is triggered, in response to detecting that there is a first TRP on which a beam failure occurs among the plurality of TRPs and detecting that there is a second TRP, among the plurality of TRPs, on which the beam failure occurs before a second time.

In an implementation of the disclosure, it is determined that the trigger condition for triggering the random access-based BFR is satisfied, in response to detecting that there is the second TRP, among the plurality of TRPs, on which the beam failure occurs after a first time and before a second time. The first time is a time when it is detected that the beam failure occurs on the first TRP and the second time (t2) is a time when the SR is sent on the PUCCH resource.

Based on the above example, when the terminal detects that there is also a second TRP on which the beam failure occurs before the time t2, the random access-based BFR is triggered.

In another implementation of the disclosure, after sending the SR on the PUCCH-SR resource at the time t2, the terminal may receive downlink control information (DCI) for scheduling PUSCH after a certain period of time. For convenience of description below, the DCI used for scheduling PUSCH is called "first DCI", and the time when the first DCI is received is called "third time" (denoted by "t3").

It is understandable that the wording "third time" and the wording "t3" involved in embodiments of the disclosure may be used interchangeably, and those skilled in the art could understand that their meanings are the same and the meaning of the wording "third time" or "t3" involved in each embodiment is the same.

FIG. 5 is a flowchart illustrating a BFR method according to an embodiment. As illustrated in FIG. 5, the BFR method is performed by a terminal. The BFR method includes the following.

At step S41, a beam failure detection is performed on a plurality of TRPs of the terminal, in response to the terminal being configured with the plurality of TRPs.

At step S42, a random access-based BFR is triggered, in response to detecting that there is a first TRP on which a beam failure occurs among the plurality of TRPs and detecting that there is a second TRP, among the plurality of TRPs, on which the beam failure occurs before a third time.

In an implementation, it is determined that the trigger condition for triggering the random access-based BFR is satisfied in response to detecting that there is the second TRP, among the plurality of TRPs, on which the beam failure occurs at the second time or after the second time and before the third time. The second time is a time when the SR is sent on the PUCCH resource and the third time is a time when the first DCI for scheduling PUSCH is received.

Based on the above example, the terminal triggers the access random-based BFR, in response to detecting that there is the second TRP on which the beam failure occurs at or after the time t2 and before the time t3.

In yet another implementation of the disclosure, it is determined that the trigger condition for triggering the random access-based BFR is satisfied, in response to detecting that there is a second TRP, among the plurality of TRPs, on which the beam failure occurs before the third time.

Based on the above example, the terminal triggers the random access-based BFR, in response to detecting that there is the second TRP on which the beam failure occurs at or after the time t1 and before the time t3.

FIG. 6 is a flowchart illustrating a BFR method according to an embodiment. As illustrated in FIG. 6, the BFR method is performed by a terminal. The BFR method includes the following.

At step S51, a beam failure detection is performed on a plurality of TRPs of the terminal, in response to the terminal being configured with the plurality of TRPs.

At step S52, a random access-based BFR is triggered, in response to detecting that there is a first TRP on which a beam failure occurs among the plurality of TRPs, detecting that there is a second TRP, among the plurality of TRPs, on which the beam failure occurs before a third time, and no DCI having been received within a first duration after a second time.

In an implementation of the disclosure, when no DCI signaling is received within a certain period of time (i.e., the first duration denoted by "T1") after the second time, it is determined that the trigger condition for triggering the random access-based BFR is satisfied. As an example, when the terminal does not receive any first DCI signaling from the time t2 to a time (t2+T1), the random access-based BFR is triggered. As another example, when the terminal does not receive any DCI (hereinafter referred to as second DCI) used for determining that the network device has received MAC CE information from the time t2 to a time (t2+T1), the random access-based BFR is triggered.

In an implementation of the disclosure, the terminal may receive the first DCI for scheduling PUSCH at the third time and send the MAC CE information related to the TRP on which the beam failure occurs on the PUSCH after a certain period of time. For the convenience of description, the time when the MAC CE information related to the TRP on which the beam failure occurs is sent on the PUSCH is called "fourth time" (denoted by "t4").

It is further understandable that the wording "fourth time" and the wording "t4" involved in embodiments of the disclosure may be used interchangeably and those skilled in the art could understand that their meanings are the same and the meaning of the wording "fourth time" or "t4" involved in each embodiment is the same.

Figure 7:
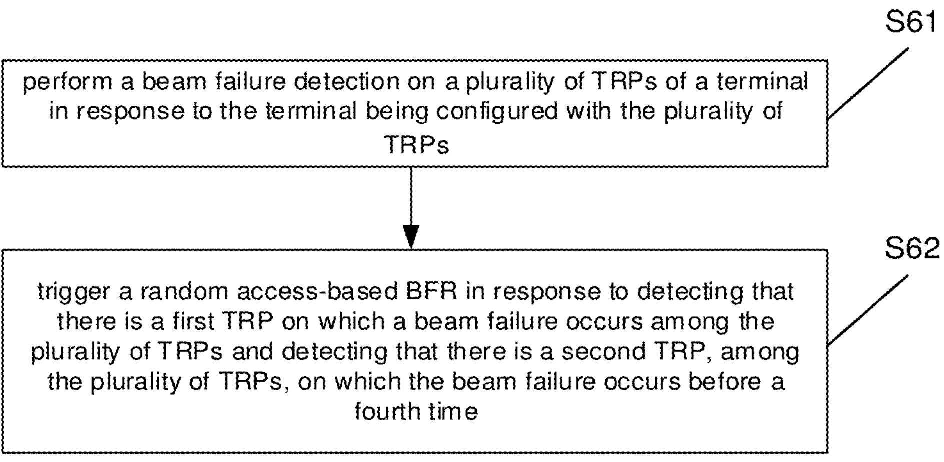
FIG. 7 is a flowchart illustrating a beam failure recovery method according to an embodiment.

FIG. 7 is a flowchart illustrating a BFR method according to an embodiment. As illustrated in FIG. 7, the BFR method is performed by a terminal. The BFR method includes the following.

At step S61, a beam failure detection is performed on a plurality of TRPs of the terminal, in response to the terminal being configured with the plurality of TRPs.

At step S62, a random access-based BFR is triggered, in response to detecting that there is a first TRP on which a beam failure occurs among the plurality of TRPs and detecting that there is a second TRP, among the plurality of TRPs, on which the beam failure occurs before a fourth time.

The fourth time is a time when MAC CE information associated with the TRP on which the beam failure occurs is sent on a PUSCH.

It is noteworthy that the PUSCH used for sending the MAC CE information related to the TRP on which the beam failure occurs may be scheduled by the first DCI signaling or may be a configure grant Type 1 or Type 2 PUSCH. For convenience of description, in following embodiments, the PUSCH used for sending the MAC CE information related to the TRP on which the beam failure occurs is called "first PUSCH".

In an implementation, it is determined that the trigger condition for triggering the random access-based BFR is satisfied, in response to detecting that there is a second TRP, among the plurality of TRPs, on which the beam failure occurs at or after the third time and before the fourth time.

Based on the above example, the terminal triggers the random access-based BFR when detecting that there is a second TRP on which the beam failure occurs at or after the time t3 and before the time t4.

In yet another implementation, it is determined that the trigger condition for triggering the random access-based BFR is satisfied, in response to detecting that there is a second TRP, among the plurality of TRPs, on which the beam failure occurs before the fourth time.

Based on the above example, the terminal triggers the random access-based BFR, when detecting that there is a second TRP on which the beam failure occurs at or after the time t1 and before the time t4.

Further, in embodiments of the disclosure, when detecting that there is a second TRP, among the plurality of TRPs, on which the beam failure occurs the fourth time and when a beam corresponding to the first PUSCH is a beam on which the beam failure occurs, it is also determined that the trigger condition for triggering the random access-based BFR is satisfied.

Figure 8:
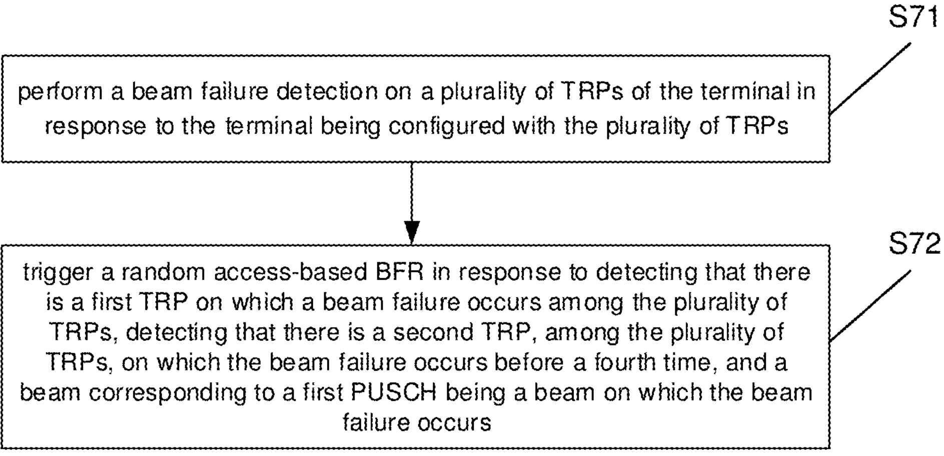
FIG. 8 is a flowchart illustrating a beam failure recovery method according to an embodiment.

FIG. 8 is a flowchart illustrating a BFR method according to an embodiment. As illustrated in FIG. 8, the BFR method is performed by a terminal. The BFR method includes the following.

At step S71, a beam failure detection is performed on a plurality of TRPs of the terminal, in response to the terminal being configured with the plurality of TRPs.

At step S72, a random access-based BFR is triggered, in response to detecting that there is a first TRP on which a beam failure occurs among the plurality of TRPs, detecting that there is a second TRP, among the plurality of TRPs, on which the beam failure occurs before a fourth time, and a beam corresponding to a first PUSCH being a beam on which the beam failure occurs.

In an implementation, it can be determined that the trigger condition for triggering the random access-based BFR is satisfied, in response to detecting that there is a second TRP, among the plurality of TRPs, on which the beam failure occurs at or after a third time and before the fourth time, and in response to a beam corresponding to the first PUSCH being a beam on which the beam failure occurs.

In another embodiment, it may also be determined that the trigger condition for triggering the random access-based BFR is satisfied, in response to detecting that there is a second TRP, among the plurality of TRPs, on which the beam failure occurs before the fourth time and in response to a beam corresponding to the first PUSCH being a beam on which the beam failure occurs.

In embodiments of the disclosure, the terminal sends the MAC CE information related to the TRP on which the beam failure occurs on the PUSCH at the fourth time and receives a second DCI signaling after a certain period of time. The time when the second DCI is received is hereinafter referred to as "fifth time" (denoted by "t5"). The fifth time is the time when the second DCI is received, and the second DCI is used for determining that a network device has received the MAC CE information.

It is further understandable that the wording "fifth time" and the wording "t5" involved in embodiments of the disclosure may be used interchangeably, and those skilled in the art could understand that their meanings are the same and the meaning of the wording "fifth time" or "t5" involved in each embodiment is the same.

Figure 9:
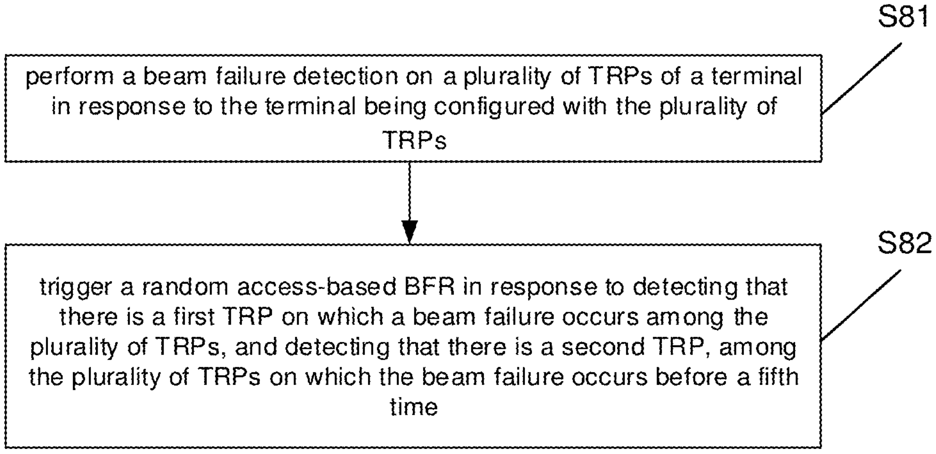
FIG. 9 is a flowchart illustrating a beam failure recovery method according to an embodiment.

FIG. 9 is a flowchart illustrating a BFR method according to an embodiment. As illustrated in FIG. 9, the BFR method is performed by a terminal. The BFR method includes the following.

At step S81, beam failure detection is performed on a plurality of TRPs of the terminal in response to the terminal being configured with the plurality of TRPs of the terminal.

At step S82, a random access-based BFR is triggered, in response to detecting that there is a first TRP on which a beam failure occurs among the plurality of TRPs and detecting that there is a second TRP, among the plurality of TRPs, on which the beam failure occurs before a fifth time.

In an implementation, it is determined that the trigger condition for triggering the random access-based BFR is satisfied in response to detecting that there is a second TRP, among the plurality of TRPs, on which the beam failure occurs at or after the fourth time and before the fifth time. The fourth time is a time when send the MAC CE information related to the TRP on which the beam failure occurs is sent on the PUSCH.

Based on the above example, the terminal triggers the random access-BFR, when detecting that there is the second TRP on which the beam failure occurs at or after the time t4 and before the time t5.

In an implementation, it is determined that the trigger condition for triggering the random access-based BFR is satisfied in response to detecting that there is the second TRP, among the plurality of TRPs, on which the beam failure occurs before the fifth time. The fifth time is a time when the second DCI is received and the second DCI is used for determining that the network device has received the MAC CE information.

Based on the above example, the terminal triggers the random access-based BFR when detecting that there is the second TRP on which the beam failure occurs at or after the time t1 and before the time t5.

Further, in embodiments of the disclosure, when the terminal detects that there is a second TRP on which the beam failure occurs before the fifth time, but the terminal does not receive any second DCI signaling within a certain period of time (hereinafter referred to as the second duration denoted by T2) after the fourth time, it is determined that the trigger condition for triggering the random access-based BFR is satisfied. That is, when no second DCI signaling is not received from the time t4 to a time (t4+T2), the random access-based BFR is triggered.

In embodiments of the disclosure, the second DCI signaling is used for determining that the network device has received the MAC CE information. The terminal will update the beam after receiving the second DCI signaling for a certain period of time. In embodiments of the disclosure, the second DCI can also be used for scheduling PUSCH. For convenience of description, the PUSCH scheduled by the second DCI is called "second PUSCH". The hybrid automatic repeat request (HARQ) Identity (ID) of the second PUSCH is the same as the HARQ ID of the first PUSCH, but its new data indicator (NDI) toggles. The first PUSCH is scheduled by the first DCI, or the first PUSCH is a configure grant Type 1 or Type 2 PUSCH.

Updating the beam includes updating at least one of: QCL Type-D parameter, uplink transmission spatial filter (UL TX spatial filter), spatial relation information (spatialrelation-info), transmission configuration indication state (TCI state), downlink TCI state (DL TCI state), or uplink TCI state (UL TCI state).

Figure 10:
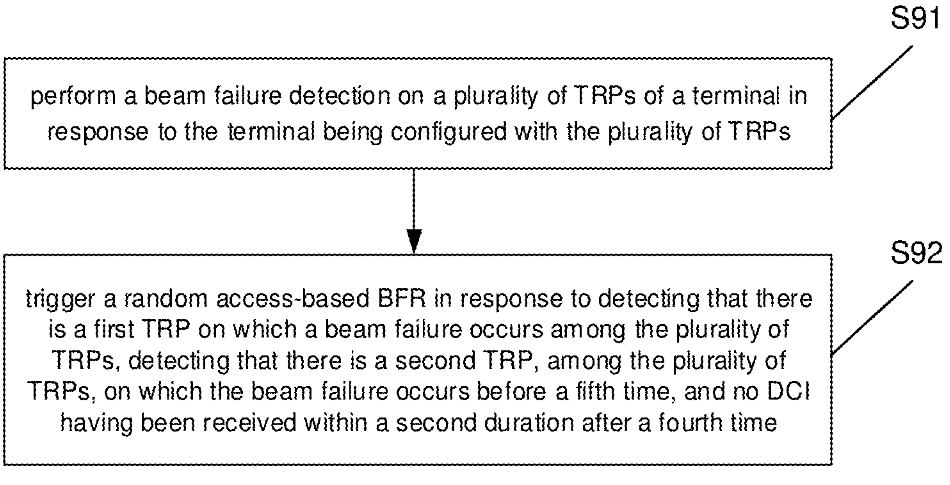
FIG. 10 is a flowchart illustrating a beam failure recovery method according to an embodiment.

FIG. 10 is a flowchart illustrating a BFR method according to an embodiment. As illustrated in FIG. 10, the BFR method is performed by a terminal. The BFR method includes the following.

At step S91, a beam failure detection is performed on a plurality of TRPs of the terminal in response to the terminal being configured with the plurality of TRPs.

At step S92, a random access-based BFR is triggered in response to detecting that there is a first TRP on which a beam failure occurs among the plurality of TRPs, detecting that there is a second TRP, among the plurality of TRPs, on which the beam failure occurs before a fifth time, and no DCI having been received within a second duration after a fourth time.

In an implementation, it is detected that there is the second TRP, among the plurality of TRPs, on which the beam failure occurs at or after the fourth time and before the fifth time, and no DCI has been received within the second duration after the fourth time.

Based on the above example, when the random access-based BFR is triggered, when the terminal detects that the beam failure occurs on the second TRP at or after the time t4 and before the time t5, but the terminal does not receive any second DCI signaling from the time t4 to a time (t4+T2), the terminal triggers the random access-based BFR.

In yet another implementation, it is detected that there is the second TRP, among the plurality of TRPs, on which the beam failure occurs before the fifth time, and no DCI has been received within the second duration after the fourth time.

Based on the above example, when the terminal detects that there is a second TRP on which the beam failure occurs at or after the time t1 and before the time t5, but the terminal does not receive any second DCI signaling from the time t4 to a time (t4+T2), the terminal triggers the random access-based BFR.

In embodiments of the disclosure, after receiving the second DCI at the fifth time, the terminal may update the beam of the TRP on which the bam failure occurs after a certain period of time, that is, the beam of the first TRP is updated. In embodiments of the disclosure, the time when the beam of the first TRP is updated is called "sixth time".

It is further understandable that the wording "sixth time" and the wording "t6" involved in embodiments of the disclosure may be used interchangeably, and those skilled in the art could understand that their meanings are the same and the meaning of the wording "sixth time" or "t6" involved in each embodiment is the same.

In an implementation, it is determined that the trigger condition for triggering the random access-based BFR is satisfied, in response to detecting that there is a second TRP, among the plurality of TRPs, on which the beam failure occurs before the sixth time. The fifth time is a time when the second DCI is received. The second DCI is used for determining that the network device has received the MAC CE information. The sixth time is a time when the beam of the first TRP is updated.

Figure 11:
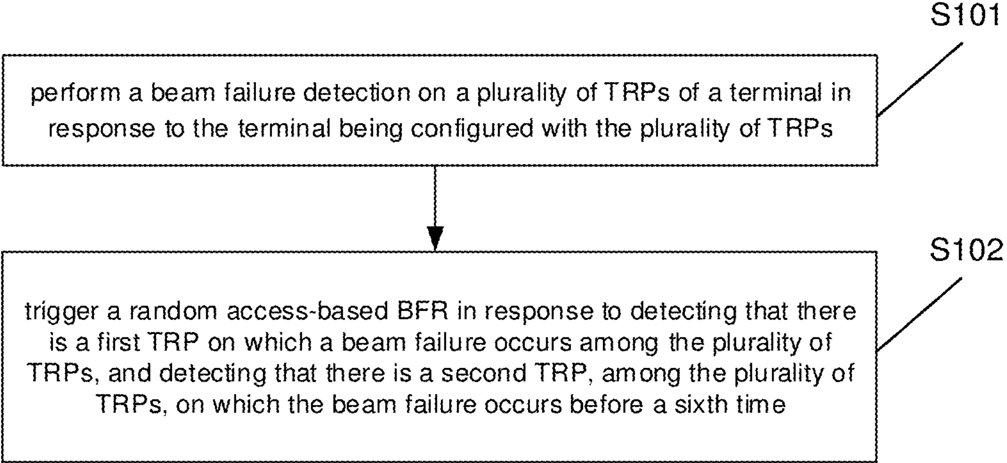
FIG. 11 is a flowchart illustrating a beam failure recovery method according to an embodiment.

FIG. 11 is a flowchart illustrating a BFR method according to an embodiment. As illustrated in FIG. 11, the BFR method is performed by a terminal. The BFR method includes the following.

At step S101, a beam failure detection is performed on a plurality of TRPs of the terminal, in response to the terminal being configured with the plurality of TRPs.

At step S102, a random access-based BFR is triggered in response to detecting that there is a first TRP on which a beam failure occurs among the plurality of TRPs and detecting that there is a second TRP, among the plurality of TRPs, on which the beam failure occurs before a sixth time.

In an implementation, it is determined that the trigger condition for triggering the random access-based BFR is satisfied in response to detecting that a second TRP, among the plurality of TRPs, on which the beam failure occurs at or after the fifth time and before the sixth time. The fifth time is a time when the second DCI is received. The second DCI is used for determining that the network device has received the MAC CE information. The sixth time is a time when the beam of the first TRP is updated.

Based on the above example, the terminal triggers the random access-based BFR when the terminal detects that the beam failure occurs on the second TRP at or after the time t5 and before the time t6.

In yet another implementation, it is determined that the trigger condition for triggering the random access-based BFR is satisfied in response to detecting that there is a second TRP, among the plurality of TRPs, on which the beam failure occurs before the sixth time.

Based on the above example, the terminal triggers the random access-based BFR when the terminal detects that there is a second TRP on which the beam failure occurs at or after the time t1 and before the time t6.

In embodiments of the disclosure, the plurality of TRPs may be continuously detected to determine whether the beam failure occurs. In response to detecting that there is another second TRP, among the plurality of TRPs, on which the beam failure occurs after the sixth time, the TRP specific BFR is triggered.

Figure 12:
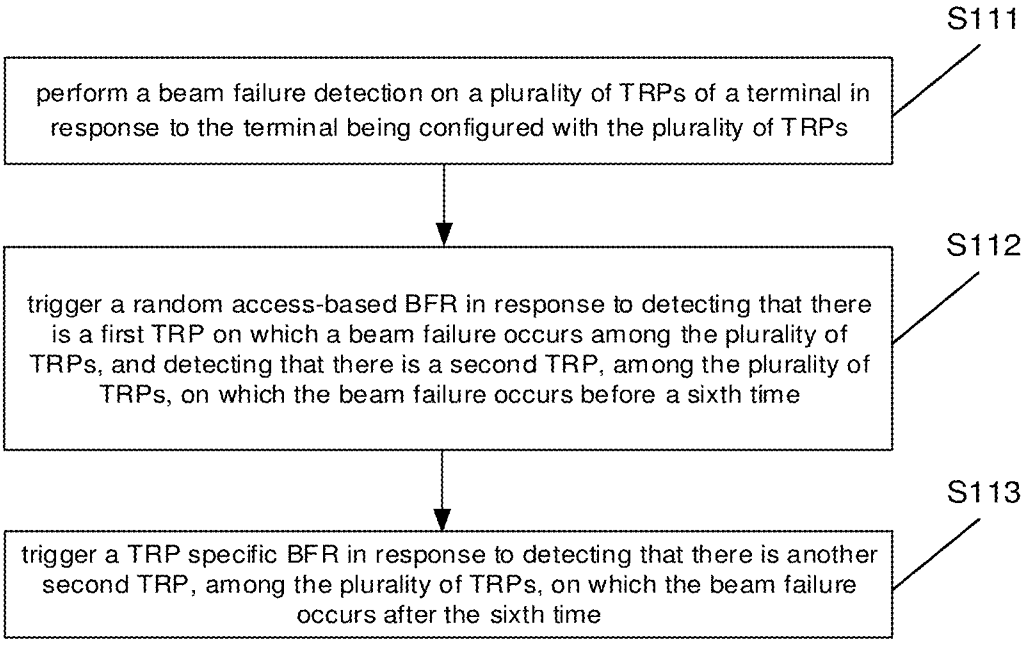
FIG. 12 is a flowchart illustrating a beam failure recovery method according to an embodiment.

FIG. 12 is a flowchart illustrating a BFR method according to an embodiment. As illustrated in FIG. 12, the BFR method is performed on a terminal. The BFR method includes the following.

At step S111, a beam failure detection is performed on a plurality of TRPs of the terminal in response to the terminal being configured with the plurality of TRPs.

At step S112, a random access-based BFR is triggered in response to detecting that there is a first TRP on which the beam failure occurs among the plurality of TRPs and detecting that there is a second TRP, among the plurality of TRPs, on which the beam failure occurs before a sixth time.

At step S113, a TRP specific BFR is triggered in response to detecting that there is another second TRP, among the plurality of TRPs, on which the beam failure occurs after the sixth time.

In embodiments of the disclosure, triggering the TRP specific BFR means triggering the BFR based on the PUCCH-SR and/or the PUSCH MAC CE.

In an example of the disclosure, the terminal is configured with two TRPs as an example for explanation, i.e., a first TRP and a second TRP. The TRP specific BFR can be understood as the following execution process.

a) The terminal detects the respective reference signal sets used for beam failure detection of the first TRP and/or the second TRP. When it is detected that the beam failure occurs on the first TRP at the time t1, the terminal waits for a PUCCH-SR that is at the time t2 nearest to the time t1. In the above example, no other PUCCH-SR has been sent before the time t1, or there will be no available PUSCH resources in a next period of time if the terminal does not send the PUSCCH-SR at the time t2.

It is understandable that in embodiments of the disclosure, for detecting the beam failure occurring on a certain TRP, a conventionally defined method can be adopted. That is, for each RS in the reference signal set, it is detected that the radio link quality of the RS is below a threshold for N times.

b) The terminal waits for the first DCI signaling, that is at the time t3, used for scheduling the first PUSCH.

c) The terminal receives the first DCI used for scheduling the first PUSCH at the time t3, and waits a period of time until the time t4 to send, on the PUSCH, the MAC CE information related to the TRP on which the beam failure occurs.

d) The terminal sends the MAC CE information related to the TRP on which the beam failure occurs on the first PUSCH at the time t4, and waits for the second DCI signaling that is at the time t5. This second DCI signaling is used for determining that the base station has received the MAC CE information. The terminal will update the beam after TO after receiving the second DCI signaling.

It is understandable that the second DCI signaling may also be used for scheduling the second PUSCH. The HARQ ID of the second PUSCH is the same as the HARQ ID of the first PUSCH, but its NDI field value toggles. The first PUSCH is scheduled by the first DCI, or the first PUSCH is a configure grant Type 1 or Type 2 PUSCH.

Further, updating the beam includes updating at least one of: QCL Type-D parameter, UL TX spatial filter, spatialrelationinfo, TCI state, DL TCI state, or UL TCI state.

e) The terminal receives the second DCI signaling at the time t5, and waits for a period of time until the time t6 to update the beam of the TRP on which the beam failure occurs.

Further, in embodiments of the disclosure, when triggering the random access-based BFR, the TRP specific BFR may be triggered or not be triggered. That is, when the random access-based BFR is triggered, whether the TRP specific BFR is triggered will not affect the random access-based BFR.

Based on the above embodiments, the trigger condition for triggering the random access-based BFR according to embodiments of the disclosure may include at least one of the following situations and the random access-based BFR is triggered.

a) When the terminal detects that the beam failure also occurs on the second TRP before the time t2, the terminal triggers the random access-based BFR.

b) When the terminal detects that the beam failure also occurs on the second TRP before the time t3, the terminal triggers the random access-based BFR.

c) When the terminal detects that the beam failure also occurs on the second TRP at or after the time t2 and before the time t3 and the terminal does not receive the first DCI signaling from the time t2 to a time (t2+T1), the terminal triggers the random access-based BFR.

d) When the terminal detects that the beam failure also occurs on the second TRP before the time t4, the terminal triggers the random access-based BFR.

e) When the terminal detects that the beam failure also occurs on the second TRP at or after the time t3 and before the time t4 and the beam corresponding to the first PUSCH is a beam on which the beam failure occurs, the terminal triggers the random access-based BFR.

f) When the terminal detects that the beam failure also occurs on the second TRP before the time t5, the terminal triggers random access-based BFR;

g) When the terminal detects that the beam failure also occurs on the second TRP at or after the time t4 and before the time t5 and the terminal does not receive the second DCI signaling from the time t4 to a time (t4+T2), the terminal triggers the random access-based BFR.

h) When the terminal detects that the beam failure also occurs on the second TRP before the time t6, the terminal triggers the random access-based BFR.

i) When the terminal detects again that the beam failure occurs on the second TRP after the time t6, the terminal only triggers the TRP specific BFR.

With the BFR method according to embodiments of the disclosure, under the Multi-TRP PDCCH scenario, in the same cell, for a terminal configured with both the TRP specific BFR and the cell specific BFR, the condition for triggering the cell specific BFR is determined to ensure the timeliness and effectiveness of the BFR.

It is noteworthy that those skilled in the art can understand that the various implementations or embodiments mentioned above in embodiments of the disclosure can be used in combination with the foregoing embodiments or can be used independently. Whether used alone or in combination with the foregoing embodiments, the implementation principles are similar. In embodiments of the disclosure, some embodiments are described in combination with the accompany implementations. Certainly, those skilled in the art can understand that such illustrations do not limit embodiments of the disclosure.

Based on the same concept, embodiments of the disclosure also provide a BFR apparatus.

It is understandable that, in order to implement the above functions, the BFR apparatus according to embodiments of the disclosure includes hardware structures and/or software modules corresponding to each function. Combined with the units and algorithm steps of each example disclosed in embodiments of the disclosure, embodiments of the disclosure can be implemented in the form of hardware or a combination of hardware and computer software. Whether a function is performed by hardware or computer software driving the hardware depends on the specific application and design constraints of the technical solution. Those skilled in the art can use different methods to implement the described functions for each specific application, but such implementation should not be considered as beyond the scope of the technical solutions of embodiments of the disclosure.

Figure 13:
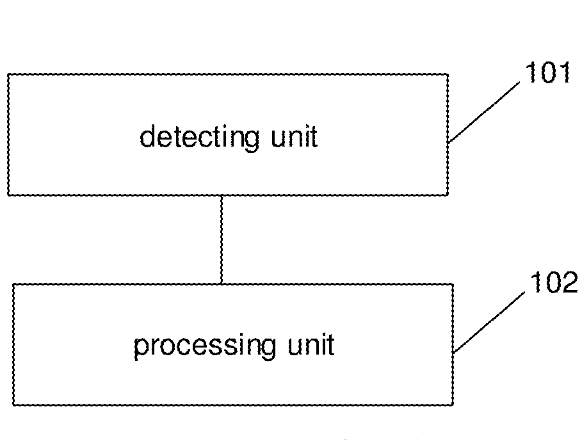
FIG. 13 is a block diagram illustrating a beam failure recovery apparatus according to an embodiment.

FIG. 13 is a block diagram illustrating a BFR apparatus according to an embodiment. As illustrated in FIG. 13, the BFR apparatus 100 includes: a detecting unit 101 and a processing unit 102.

The detecting unit 101 is configured to perform a beam failure detection on a plurality of TRPs of the terminal, in response to the terminal being configured with the plurality of TRPs. The processing unit 102 is configured to trigger a random access-based BFR, in response to detecting that there is a first TRP on which a beam failure occurs among the plurality of TRPs.

In an implementation, the processing unit 102 is further configured to determine that a trigger condition for triggering the random access-based BFR is satisfied before triggering the random access-based BFR.

In an implementation, the processing unit 102 determines that the trigger condition for triggering the random access-based BFR is satisfied in response to detecting, by the detecting unit 101, that there is a second TRP, among the plurality of TRPs, on which the beam failure occurs before a second time. The first time is a time when it is detected that the beam failure occurs on the first TRP, and the second time is a time when a SR is sent on a PUCCH resource.

In an implementation, the processing unit 102 determines that the trigger condition for triggering the random access-based BFR is satisfied in response to detecting, by the detecting unit 101, that there is a second TRP, among the plurality of TRPs, on which the beam failure occurs before a third time. The third time is a time when first DCI for scheduling a PUSCH is received.

In an implementation, the processing unit 102 determines that the trigger condition for triggering the random access-based BFR is satisfied in response to no DCI having been received within a first duration after a second time. The second time is a time when a SR is sent on a PUCCH resource.

In an implementation, the processing unit 102 determines that the trigger condition for triggering the random access-based BFR is satisfied in response to detecting, by the detecting unit 101, that there is a second TRP, among the plurality of TRPs, on which the beam failure occurs before a fourth time. The fourth time is a time when MAC CE information associated with the TRP on which the beam failure occurs is sent on a first PUSCH.

In an implementation, the processing unit 102 determines that the trigger condition for triggering the random access-based BFR is satisfied in response to a beam corresponding to the first PUSCH being a beam on which the beam failure occurs.

In an implementation, the processing unit 102 determines that the trigger condition for triggering the random access-based BFR is satisfied in response to detecting, by the detecting unit 101, that there is a second TRP, among the plurality of TRPs, on which the beam failure occurs before a fifth time. The fifth time is a time when second DCI is received. The second DCI is configured to determine that a network device has received the MAC CE information.

In an implementation, the second DCI is used for scheduling a second PUSCH.

A HARQ ID of the second PUSCH scheduled by the second DCI is identical to a HARQ ID of a first PUSCH. The first PUSCH is scheduled by first DCI, or the first PUSCH is a configure grant Type 1 or Type 2 PUSCH, and/or a NDI of the second PUSCH scheduled by the second DCI toggles.

In an implementation, the processing unit 102 determines that the trigger condition for triggering the random access-based BFR is satisfied in response to no DCI having been received within a second duration after a fourth time. The fourth time is a time when the MAC CE information associated with the TRP on which the beam failure occurs is sent on a first PUSCH.

In an implementation, the processing unit 102 determines that the trigger condition for triggering the random access-based BFR is satisfied in response to detecting, by the detecting unit 101, that there is a second TRP, among the plurality of TRPs, on which the beam failure occurs before a sixth time. The sixth time is a time when a beam of the first TRP is updated.

In an implementation, the processing unit 102 triggers a TRP specific BFR in response to detecting, by the detecting unit 101, that there is another second TRP, among the plurality of TRPs, on which the beam failure occurs after a sixth time.

In an implementation, triggering the TRP specific BFR includes: triggering the BFR based on the PUCCH-SR and/or the PUSCH MAC CE.

In an implementation, the processing unit 102 is configured to trigger the TRP specific BFR or not trigger the TRP specific BFR.

In an implementation, the terminal being configured with the plurality of TRPs includes: the terminal being configured with a plurality of reference signal resource sets for beam failure detection and/or the terminal being configured with a plurality of control resource pool index values.

Regarding the apparatus in above embodiments, the specific manner in which each module performs operations has been described in detail in embodiments related to the method, and will not be described in detail here.

Figure 14:
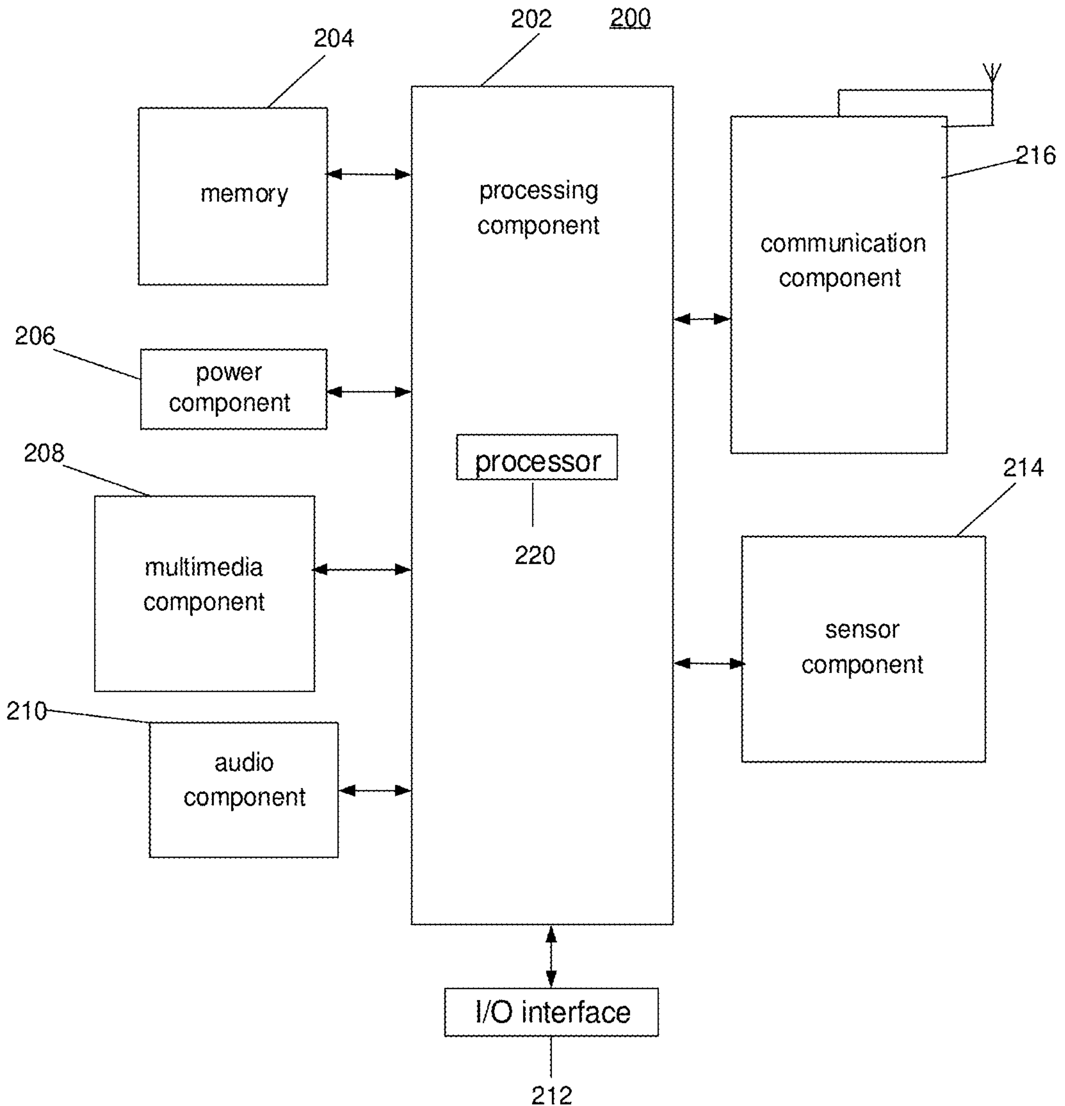
FIG. 14 is a block diagram illustrating a device for beam failure recovery according to an embodiment.

FIG. 14 is a block diagram illustrating a device 200 for BFR according to an embodiment. For example, the device 200 may be a mobile phone, a computer, a digital broadcasting terminal, a message transceiver device, a game console, a tablet device, a medical device, a fitness device and a PDA.

As illustrated in FIG. 14, the device 200 may include one or more of: a processing component 202, a memory 204, a power component 206, a multimedia component 208, an audio component 210, an input/output (I/O) interface 212, a sensor component 214, or a communication component 216.

The processing component 202 typically controls overall operations of the device 200, such as the operations associated with display, telephone call, data communication, camera operation, and recording operation. The processing component 202 may include one or more processors 220 to perform instructions to implement all or part of the steps in the above described methods. Moreover, the processing component 202 may include one or more modules which facilitate the interaction between the processing component 202 and other components. For example, the processing component 202 may include a multimedia module to facilitate the interaction between the multimedia component 208 and the processing component 202.

The memory 204 is configured to store various types of data to support the operation of the device 200. Examples of such data include instructions for any applications or methods operated on the device 200, contact data, phonebook data, messages, pictures, videos, etc. The memory 204 may be implemented using any type of volatile or non-volatile memory devices, or a combination thereof, such as a static random-access memory (SRAM), an electrically-erasable programmable read only memory (EEPROM), an erasable programmable read only memory (EPROM), a programmable read-only memory (PROM), a read only memory (ROM), a magnetic memory, a flash memory, a magnetic or optical disk.

The power component 206 provides power to various components of the device 200. The power component 206 may include a power management system, one or more power sources, and any other components associated with the generation, management, and distribution of power in the device 200.

The multimedia component 208 includes a screen providing an output interface between the device 200 and the user. In some embodiments, the screen may include a Liquid Crystal Display (LCD) and a Touch Panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 208 includes a front-facing camera and/or a rear-facing camera. When the device 200 is in an operating mode, such as a shooting mode or a video mode, the front-facing camera and/or the rear-facing camera can receive external multimedia data. Each front-facing camera and rear-facing camera may be a fixed optical lens system or has focal length and optical zoom capability.

The audio component 210 is configured to output and/or input audio signals. For example, the audio component 210 includes a microphone (MIC) configured to receive an external audio signal when the device 200 is in an operation mode, such as a calling mode, a recording mode, and a voice recognition mode. The received audio signal may be further stored in the memory 204 or transmitted via the communication component 216. In some embodiments, the audio component 210 further includes a speaker to output audio signals.

The I/O interface 212 provides an interface between the processing component 202 and peripheral interface modules, such as a keyboard, a click wheel, buttons, and the like. The buttons may include, but are not limited to, a home button, a volume button, a starting button, and a locking button.

The sensor component 214 includes one or more sensors to provide status assessments of various aspects of the device 200. For instance, the sensor component 214 may detect an open/closed status of the device 200, relative positioning of components, e.g., the display and the keypad, of the device 200, a change in position of the device 200 or a component of the device 200, a presence or absence of a user contact with the device 200, an orientation or an acceleration/deceleration of the device 200, and a change in temperature of the device 200. The sensor component 214 may include a proximity sensor configured to detect the presence of nearby objects without any physical contact. The sensor component 214 may also include a light sensor, such as a Complementary Metal Oxide Semiconductor (CMOS) or Charge-Coupled Device (CCD) image sensor, for use in imaging applications. In some embodiments, the sensor component 214 may also include an accelerometer sensor, a gyroscope sensor, a magnetic sensor, a pressure sensor, or a temperature sensor.

The communication component 216 is configured to facilitate communication, wired or wirelessly, between the device 200 and other devices. The device 200 can access a wireless network based on a communication standard, such as WiFi, 2G, or 3G, or a combination thereof. In an embodiment, the communication component 216 receives a broadcast signal from an external broadcast management system or broadcast associated information via a broadcast channel. In an embodiment, the communication component 216 further includes a Near Field Communication (NFC) module to facilitate short-range communication. For example, the NFC module may be implemented based on a RF Identification (RFID) technology, an Infrared Data Association (IrDA) technology, an Ultra-Wide Band (UWB) technology, a Blue Tooth (BT) technology, and other technologies.

In embodiments, the device 200 may be implemented with one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, for performing the above described methods.

In embodiments, there is also provided a non-transitory computer readable storage medium including instructions, such as the memory 204, executable by the processor 220 in the device 200, for implementing the above methods. For example, the non-transitory computer-readable storage medium may be a ROM, a Random Access Memory (RAM), a CD-ROM, a magnetic tape, a floppy disc, and an optical data storage device.

Technical solutions according to embodiments of the disclosure may include the following beneficial effects. When the terminal is configured with multiple TRPs, the beam failure detection is performed on the multiple TRPs. In response to detecting that the beam failure occurs on one of the plurality of TRPs, the random access-based BFR is triggered. Therefore, the random access-based BFR can be performed timely in the multi-TRP scenario, thereby ensuring timeliness and effectiveness of the BFR.

It is further understandable that the term "multiple" in the disclosure refers to two or more, which is the similar for other quantifiers. The term "and/or" describes a relation of associated objects, which indicates three relations, for example, "A and/or B" indicates that A exists alone, A and B both exist, and B exists alone. The character "/" generally indicates that the associated objects prior to and after the character "/" is an "or" relation. The terms "a", "said" and "the" in the singular form are also intended to include the plural form, unless the context clearly indicates otherwise.

It is further understandable that the terms "first", "second", etc. are used to describe various types of information, but that such information should not be limited to these terms. These terms are used only to distinguish information of the same type from each other and do not indicate a particular order or degree of importance. In fact, the expressions "first" and "second" can be used interchangeably. For example, without departing from the scope of this disclosure, first information may also be referred to as second information, and similarly, second information may also be referred to as first information.

It is further understandable that although the operations are depicted in the accompanying drawings in a particular order in the embodiments of the disclosure, it should not be construed as requiring that the operations are performed in the particular sequence shown or in a serial sequence, or that all of the operations shown be performed to obtain the desired results. Multitasking and parallel processing may be advantageous in particular environments.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the disclosure as come within known or customary practice in the art. It is intended that the specification and examples are considered as illustrative only, with a true scope and spirit of the disclosure being indicated by the following claims.

It will be appreciated that the disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A beam failure recovery method, performed by a terminal, comprising:

performing a beam failure detection on a plurality of Transmit/Receive Points (TRPs) of the terminal, in response to the terminal being configured with the plurality of TRPs;

determining that a trigger condition for triggering a random access-based beam failure recovery is satisfied; and triggering the random access-based beam failure recovery in response to detecting that there is a first TRP on which a first beam failure occurs among the plurality of TRPs;

wherein determining that the trigger condition for triggering the random access-based beam failure recovery is satisfied comprises: determining that the trigger condition for triggering the random access-based beam failure recovery is satisfied in response to detecting that there is a second TRP, among the plurality of TRPs, on which a second beam failure occurs before a time when second downlink control information is received, and the second downlink control information is used for determining that a network device has received medium access control control element (MAC CE) information.

2. The method of claim 1, wherein determining that the trigger condition for triggering the random access-based beam failure recovery is satisfied further comprises:

determining that the trigger condition for triggering the random access-based beam failure recovery is satisfied in response to detecting that there is the second TRP, among the plurality of TRPs, on which the second beam failure occurs after a first time and before a second time;

wherein the first time is a time when detecting that the first beam failure occurs on the first TRP, and the second time is a time when a scheduling request (SR) is sent on a physical uplink control channel (PUCCH) resource.

3. The method of claim 1, wherein determining that the trigger condition for triggering the random access-based beam failure recovery is satisfied comprises:

determining that the trigger condition for triggering the random access-based beam failure recovery is satisfied in response to detecting that there is the second TRP, among the plurality of TRPs, on which the second beam failure occurs before a third time;

wherein the third time is a time when first downlink control information for scheduling a physical uplink shared channel (PUSCH) is received.

4. The method of claim 3, wherein determining that the trigger condition for triggering the random access-based beam failure recovery is satisfied comprises:

determining that the trigger condition for triggering the random access-based beam failure recovery is satisfied in response to no downlink control information having been received within a first duration after a second time, wherein the second time is a time when a scheduling request (SR) is sent on a physical uplink control channel (PUCCH) resource.

5. The method of claim 1, wherein determining that the trigger condition for triggering the random access-based beam failure recovery is satisfied comprises:

determining that the trigger condition for triggering the random access-based beam failure recovery is satisfied in response to detecting that there is the second TRP, among the plurality of TRPs, on which the second beam failure occurs before a fourth time;

wherein the fourth time is a time when medium access control control element (MAC CE) information associated with the first TRP on which the first beam failure occurs is sent on a first physical uplink shared channel (PUSCH).

6. The method of claim 5, wherein determining that the trigger condition for triggering the random access-based beam failure recovery is satisfied comprises:

determining that the trigger condition for triggering the random access-based beam failure recovery is satisfied in response to a beam corresponding to the first PUSCH being a beam on which a beam failure occurs;

wherein the first PUSCH is scheduled by first downlink control information or the first PUSCH is a configure grant Type 1 or Type 2 PUSCH.

7. The method of claim 1, wherein:

the second downlink control information is used for scheduling a second physical uplink shared channel (PUSCH); or a hybrid automatic repeat request identity of the second PUSCH scheduled by the second downlink control information is identical to a hybrid automatic repeat request identity of a first PUSCH, wherein the first PUSCH is used for sending the MAC CE information associated with the first TRP on which the first beam failure occurs; or a new data indicator of the second PUSCH scheduled by the second downlink control information toggles.

8. The method of claim 1, wherein determining that the trigger condition for triggering the random access-based beam failure recovery is satisfied comprises:

determining that the trigger condition for triggering the random access-based beam failure recovery is satisfied in response to no downlink control information having been received within a second duration after a fourth time, wherein the fourth time is a time when the MAC CE information associated with the first TRP on which the first beam failure occurs is sent on a first physical uplink shared channel (PUSCH).

9. The method of claim 1, wherein determining that the trigger condition for triggering the random access-based beam failure recovery is satisfied comprises:

determining that the trigger condition for triggering the random access-based beam failure recovery is satisfied in response to detecting that there is the second TRP, among the plurality of TRPs, on which the second beam failure occurs before a sixth time;

wherein the sixth time is a time when a beam of the first TRP is updated.

10. The method of claim 9, further comprising:

triggering a TRP specific beam failure recovery in response to detecting that there is another second TRP, among the plurality of TRPs, on which a third beam failure occurs after the sixth time.

11. The method of claim 10, wherein triggering the TRP specific beam failure recovery comprises:

triggering a beam failure recovery based on at least one of a physical uplink control channel (PUCCH)—scheduling request (SR) or a physical uplink shared channel (PUSCH) medium access control control element (MAC CE).

12. The method of claim 1, further comprising:

triggering a TRP specific beam failure recovery, or not triggering the TRP specific beam failure recovery.

13. The method of claim 1, wherein the terminal being configured with the plurality of TRPs comprises at least one of:

the terminal being configured with a plurality of reference signal resource sets for beam failure detection, or the terminal being configured with a plurality of control resource pool index values.

14. A terminal, comprising:

a processor; and a memory storing instructions executable by the processor;

wherein the processor is configured to:

perform a beam failure detection on a plurality of Transmit/Receive Points (TRPs) of the terminal, in response to the terminal being configured with the plurality of TRPs;

determine that a trigger condition for triggering a random access-based beam failure recovery is satisfied; and trigger the random access-based beam failure recovery in response to detecting that there is a first TRP on which a first beam failure occurs among the plurality of TRPs;

wherein the processor is further configured to: determine that the trigger condition for triggering the random access-based beam failure recovery is satisfied in response to detecting that there is a second TRP, among the plurality of TRPs, on which a second beam failure occurs before a time when second downlink control information is received, and the second downlink control information is used for determining that a network device has received medium access control control element (MAC CE) information.

15. A non-transitory computer-readable storage medium having instructions stored thereon, wherein when the instructions are executed by a processor of a terminal, the terminal is caused to:

perform a beam failure detection on a plurality of Transmit/Receive Points (TRPs) of the terminal, in response to the terminal being configured with the plurality of TRPs;

determine that a trigger condition for triggering a random access-based beam failure recovery is satisfied; and trigger the random access-based beam failure recovery in response to detecting that there is a first TRP on which a first beam failure occurs among the plurality of TRPs;

wherein the terminal is further caused to: determine that the trigger condition for triggering the random access-based beam failure recovery is satisfied in response to detecting that there is a second TRP, among the plurality of TRPs, on which a second beam failure occurs before a time when second downlink control information is received, and the second downlink control information is used for determining that a network device has received medium access control control element (MAC CE) information.

16. The terminal of claim 14, wherein the processor is further configured to:

determine that the trigger condition for triggering the random access-based beam failure recovery is satisfied in response to detecting that there is the second TRP, among the plurality of TRPs, on which the second beam failure occurs after a first time and before a second time;

wherein the first time is a time when detecting that the first beam failure occurs on the first TRP, and the second time is a time when a scheduling request (SR) is sent on a physical uplink control channel (PUCCH) resource.

* * * * *